(12) United States Patent
Shan et al.

(10) Patent No.: US 8,705,145 B2
(45) Date of Patent: Apr. 22, 2014

(54) SYSTEMS AND METHODS FOR RESUMING CAPTURE OF A BASE IMAGE OF AN OBJECT BY A MOBILE SCANNER

(75) Inventors: Jizhang Shan, Cupertino, CA (US); Weihua Xiong, Cupertino, CA (US); Zhipeng Deng, Shanghai (CN)

(73) Assignee: OmniVision Technologies, Inc., Santa Clara, CA (US)

( * ) Notice: Subject to any disclaimer, the term of this patent is extended or adjusted under 35 U.S.C. 154(b) by 20 days.

(21) Appl. No.: 13/604,672

(22) Filed: Sep. 6, 2012

(65) Prior Publication Data

US 2014/0063565 A1 Mar. 6, 2014

(51) Int. Cl.
*H04N 1/024* (2006.01)

(52) U.S. Cl.
USPC ........... 358/473; 358/474; 358/450; 382/313; 382/100

(58) Field of Classification Search
USPC ......... 358/473, 474, 1.15, 450, 453; 382/276, 382/100, 313
See application file for complete search history.

(56) References Cited

U.S. PATENT DOCUMENTS

| | | | | |
|---|---|---|---|---|
| 6,002,124 | A * | 12/1999 | Bohn et al. | 250/208.1 |
| 6,265,706 | B1 * | 7/2001 | Oliver et al. | 250/208.1 |
| 6,429,422 | B1 * | 8/2002 | Bohn | 250/234 |
| 8,339,467 | B2 * | 12/2012 | Zahnert et al. | 348/218.1 |
| 8,441,695 | B2 * | 5/2013 | Zahnert et al. | 358/473 |
| 8,441,696 | B2 * | 5/2013 | Zahnert et al. | 358/473 |
| 8,447,144 | B2 * | 5/2013 | King et al. | 382/313 |
| 8,582,182 | B2 * | 11/2013 | Zahnert et al. | 358/473 |
| 2009/0244648 | A1 | 10/2009 | Chan et al. | |
| 2010/0124384 | A1 * | 5/2010 | Edgar et al. | 382/313 |
| 2010/0296133 | A1 | 11/2010 | Zahnert et al. | |

* cited by examiner

*Primary Examiner* — Negussie Worku
(74) *Attorney, Agent, or Firm* — Lathrop & Gage LLP (57) ABSTRACT

Systems and methods resume capture of a base image from an object by a mobile scanner operated by a user. An indication of an overlap area on a base image displayed within a computer display is received. A scan image is received from the mobile scanner positioned on the object at a location corresponding to the overlap area. A match between a segment of the scan image and a corresponding segment of the base image is determined, where the match defines a location and orientation of the mobile scanner relative to the base image. An indication that the scan has resumed is made to the user when the match is found, and images that are subsequently received from the mobile scanner are stitched to the base image based upon the determined location and orientation. The partially formed base image and the scanner image are concurrently displayed to the user.

21 Claims, 11 Drawing Sheets

SYSTEMS AND METHODS FOR RESUMING CAPTURE OF A BASE IMAGE OF AN OBJECT BY A MOBILE SCANNER

FIELD OF THE INVENTION

Embodiments relate to dual purpose mouse scanners. In particular, embodiments relate to scanner systems and methods that are capable of resuming scanning after an initial scan is finished.

BACKGROUND

A CMOS imaging sensor has been integrated with a computer mouse to allow the mouse to function as a scanner. The imaging sensor captures images as the mouse is moved over an object and the captured images are combined (e.g., stitched and/or merged together) to form an image of the object in real-time. Such combined functionality (mouse and scanner) reduces the need for a separate, and often large, desktop scanner. One such prior art mouse scanning product is LG's LSM-100, which includes an image sensor in a dual-purpose mouse. The product operates as a conventional computer mouse and the image sensor allows it to also function as a scanner. In scanner mode, as the user moves the mouse over an object, the image sensor is used to capture a plurality of images, each image being a portion of the object beneath the mouse. These images are then merged together in real-time to produce the image of the object.

However, such prior art mouse scanning systems generate one output image for each scan operation and do not allow the scan operation to be paused and resumed with or without repositioning of the mouse scanner. Thus, where a first portion of the object is captured in a first scan operation and a second portion of the object is captured in a second scan operation, two output images result. To form a single image of the object, these two resultant images must be combined in an external program and/or operation. This problem is exacerbated because prior art mouse scanning systems terminate the scan operation when the mouse is lifted from the object, thereby prematurely closing the resulting image file when the mouse is accidently lifted during operation. With prior art systems, the user must either restart the scan operation, or must generate a second resulting image for merging with the first resulting image in an external operation.

Further, during the scanning operation, the prior art mouse scanning systems show only the resultant image as it is being constructed and do not show the "current frame" captured by the mouse. Thus it can be difficult to follow the current location of the mouse over the object when watching the computer display.

SUMMARY OF THE INVENTION

A user uses a mobile scanner (e.g., a mouse scanner) connected to a computer to scan an object to produce a base image. To resume scanning after the base image is produced, the user defines a resume location on the base image of the object, and positions the scanner on the part of the object that corresponds to the indicated resume location. The system attempts to match subsequently scanned images to the base image at the resume location. When a match is found, the position of the scanner relative to the base image is determined. The system concurrently displays both the base image and the current scan image received from the scanner, thereby allowing the user to see the image that the scanner is currently capturing.

In one embodiment, the scanner may operate as a computer mouse ("mouse mode"), or as a scanner to capture images ("scan mode"). The scanner may optionally have a "location mode" that allows the user to select a resume location to resume an incomplete scan. In one embodiment, the user may select one of the operating modes by pressing one or more buttons on the scanner. In another embodiment, the system selects the operating mode automatically. The user indicates that a scan is to be resumed by selecting the location mode and indicating on the base image where the scan is to be resumed. The user then positions the scanner on the part of the object that corresponds to the indicated resume location, and moves the scanner around in the vicinity of the resume location. The system then matches images received from the scanner to the base image within an area of the base image defined by the indicated resume location. Once a match is found, the system indicates that the scan may resume. The user then resumes moving the scanner over the object to add subsequent scanned images to the base image.

To reduce the computational workload when matching the scanned images to the base image, the scanner may scan at a reduced resolution when it is operating in the location mode. When a match is found, the scanner is then switched back to the high resolution mode to capture high resolution images that are stitched onto the base image.

To further reduce the computational requirement for matching the scanned image with the base image, the match function obtains high frequency information (e.g., black and white contrast) from the scanned images and the base image. Using high frequency information for matching reduces the amount of computation. The high frequency information is also used to determine the location and orientation of where the scanned image matches the base image. Once the match location and match angle of the scan image relative to the base image are determined, scanning is resumed, and subsequently received scan images may be added to the base image based upon information including the match location, the match angle, and the relative movement of the scanner between each scan image.

In one embodiment, a computer-implemented method resumes capture of a base image from an object by a mobile scanner operated by a user. First, an indication of an overlap area on a base image displayed within a first window of the computer display is received. Then, a scanner image is received from the mobile scanner that is positioned on the part of the object that corresponds to the overlap area. Then, a match between a segment of the scanned image and a corresponding segment of the base image is determined, wherein the match defines a location and orientation of the mobile scanner relative to the base image. Upon successful matching, an indication that the scan may now resume is made to the user. Subsequently received images from the mobile scanner are then stitched to the base image.

In another embodiment, a computer-implemented method resumes capture of an image of a source object using a mobile scanner. First, an indication of a scan resume point on a base image that is displayed within a first window of a computer display is received. Then, an image is captured from the mobile scanner that is positioned on the source object at a location indicated by the scan resume point during a subsequent scan operation, where the scan image overlaps at least a portion of the base image at an overlap area. Then, a segment of the image and a corresponding segment of the base image at the overlap area are matched to determine a location and an orientation of the mobile scanner relative to the base image. Finally, overlapping subsequent scan images received from the mobile scanner are stitched to the base image based upon the movement of the mobile scanner relative to the determined location and orientation.

In another embodiment, a system resumes capture of a base image from an object. The system includes a mobile scanner for capturing images of the object and a computer having a processor and a memory. The computer is in communication with the mobile scanner. Machine readable instructions are stored within the memory and executed by the processor to perform the steps of: receiving an indication of an overlap area on a base image displayed on a display of the computer; receiving a scan image from the mobile scanner positioned on the object at a location corresponding to the overlap area; determining a match between a segment of the scan image and a corresponding segment of the base image, wherein the match defines a location and an orientation of the mobile scanner relative to the base image; indicating to the user that a scan has resumed; and stitching images subsequently received from the mobile scanner to the base image based upon the determined location and orientation.

DETAILED DESCRIPTION OF THE EMBODIMENTS

Figure 1:
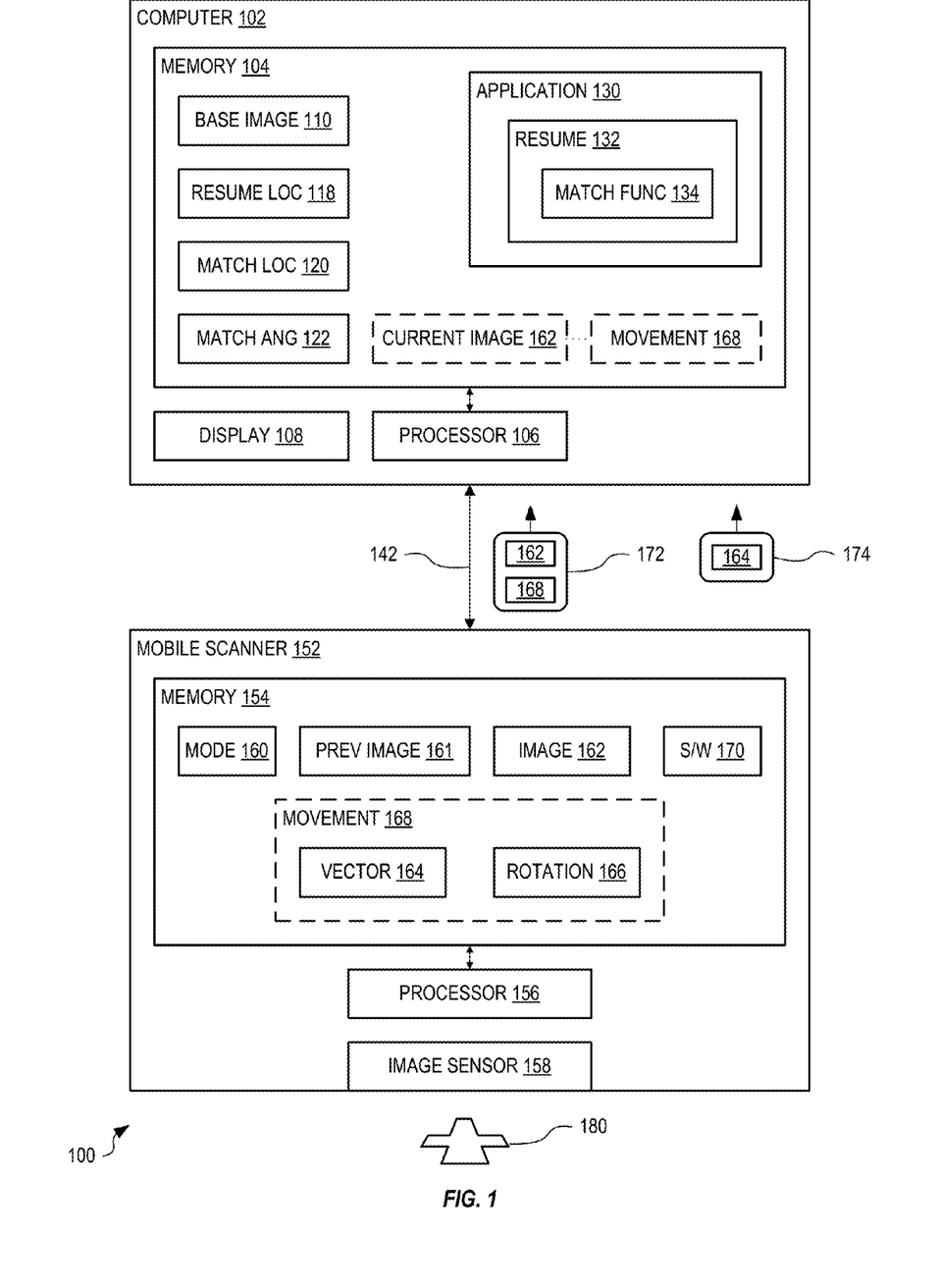
FIG. 1 shows one exemplary system for resuming capture of a base image of an object by a mobile scanner, in an embodiment.

FIG. 1 shows one exemplary system 100 for resuming capture of a base image 110 of an object 180 by a mobile scanner 152 (e.g., a handheld scanner). System 100 includes a computer 102 that communicatively couples via communication link 142 (wired or wireless) to scanner 152. Computer 102 includes a memory 104 coupled with a processor 106. Memory 104 may represent one or both of volatile memory (e.g., RAM, DRAM, etc.) and non-volatile memory (e.g., Flash, magnetic storage, optical storage, etc.), and is used to store data and software that is executed by processor 106 to implement functionality of system 100 within computer 102. Computer 102 may represent a personal computer, a tablet computer, and other similar computing devices.

Scanner 152 includes a memory 154, a processor 156, and an image sensor 158. Memory 154 may represent one or both of volatile memory (e.g., RAM, DRAM, etc.) and non-volatile memory (e.g., Flash etc.), and is used to store data and software 170 that is executed by processor 156 to implement functionality of system 100 within scanner 152. Scanner 152 is for example a dual function mouse style scanner that functions both as a computer mouse to control computer 102 and a hand held scanner that captures images of object 180 for processing by computer 102.

Software 170 includes machine readable instructions that when executed by processor 156 control scanner 152 to operate in one of two modes: "mouse mode" and "scanner mode." A mode flag 160 within memory 154 of scanner 152 defines which operating mode is currently selected for scanner 152. Optionally, scanner 152 also includes a "location mode" (e.g., a coarse scan mode) wherein images are captured at a lower resolution as compared to images captured when the scanner is in scanner mode. In mouse mode, scanner 152 operates similar to a conventional computer mouse. In scanner mode, scanner 152 captures and sends images from image sensor 158 to computer 102 via communication link 142. In location mode, scanner 152 captures and sends lower resolution images, as compared to images captured in scanner mode, from image sensor 158 to computer 102 via communication link 142. In an alternative embodiment, scanner 152 operates in a single scanning mode (e.g., scanner 152 has a single scanning function as found in conventional handheld scanners), computer 102 includes a separate computer mouse and/or other input device controlled by the user.

In one example of operation in scanner mode, software 170 is executed by processor 156 to periodically (e.g., every 50 ms) capture image 162 (shown stored within memory 154) from image sensor 158 at a high resolution (and quality). Scanner 152 then determines movement information 168 of scanner 152 relative to a previous position and orientation of scanner 152 when a previous image 161 was captured. Movement information 168 comprises a translational movement as quantified by a linear vector 164 and a rotational movement as quantified by a rotation angle 166 that together define the change in position and angle of mobile scanner 152 relative to the position of the scanner when the previous image 161 was captured. For example, based upon processing of at least part of previous image 161 and at least part of new image 162, software 170 may determine vector 164 and rotation angle 166 that together indicate a relative movement of scanner 152 between the current image 162 and the previous image 161. Scanner 152 may use other technology to determine movement information 168 without departing from the scope hereof. Scanner 152 then sends image 162 and movement information 168, illustratively shown within a message 172, to computer 102 for further processing.

If implemented, operation of scanner 152 in location mode is similar to operation in scanner mode, except that previous image 161 and image 162 have a lower resolution.

In mouse mode, scanner 152 periodically determines vector 164 (e.g., from captured images or other means) and sends vector 164 to computer 102 as shown within a message 174. That is, to computer 102, scanner 152 operates similar to a conventional computer mouse.

Mode flag 160 is controlled by computer 102 based upon execution of application 130 by processor 106. Application 130 is software with machine readable instructions that, when executed by processor 106, controls computer 102 to interact with scanner 152 to capture a base image 110 of object 180. For example, application 130 may control mode flag 160 of scanner 152 to configure scanner 152 into scanner mode and then construct base image 110 as scanner 152 is moved over object 180 by stitching received images (e.g., image 162) together based upon movement information 168 of scanner 152.

Scanning of images with a hand held scanner is known in the art. However, in the prior art, when scanning stops, by user control or when the scanner is lifted from the object being scanned, this first image is considered complete and scanning cannot resume with the first image. Rather, when scanning is resumed, a second image is constructed. Where these first and second images are of different parts of the same object and a single complete image is desired, an additional process is required to align (based upon overlap) and join the first and second images together to form the complete image.

Application 130 constructs a base image 110 from a plurality of messages 172 received from scanner 152 as the user moves the scanner over the object. When scanning stops, such as when the user lifts the scanner from object 180 or otherwise indicates that scanning is stopped, application 130 allows the user to select a resume function 132 if continued scanning of the same object into the same image is desired. Resume function 132 allows the user to interactively define a resume location 118 within base image 110, position scanner 152 on object 180 at a location that corresponds to the resume location 118, and then resume scanning of object 180 into the same base image 110. Resume function 132 includes a match function that determines a location and orientation of scanner 152 relative to base image 110 at resume location 118. Resume location 118 defines an area within base image 110 within which scanning will resume and thereby limits the amount of data processing required to align the resumed scan images with base image 110.

Figure 2:
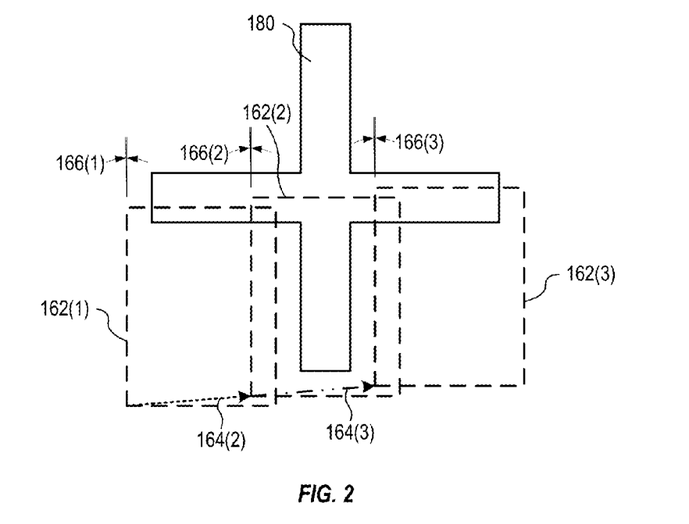
FIG. 2 shows exemplary movement of the scanner of FIG. 1 over the object to generate images, vectors and rotation angles within the scanner.
Figure 3:
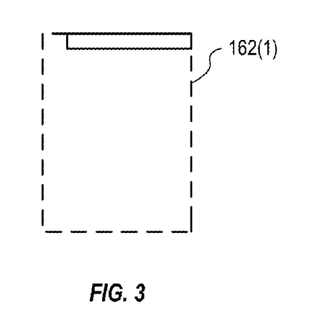
FIGS. 3, 4 and 5 show the exemplary images of FIG. 2.
Figures 4, 5:
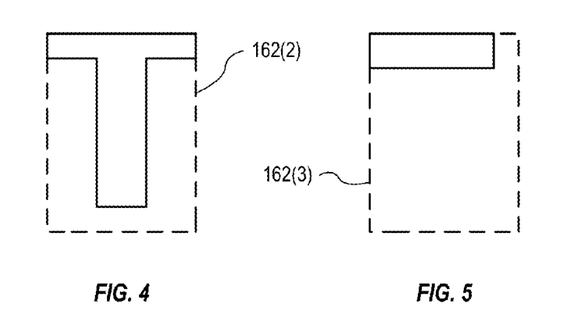
Figure 6:
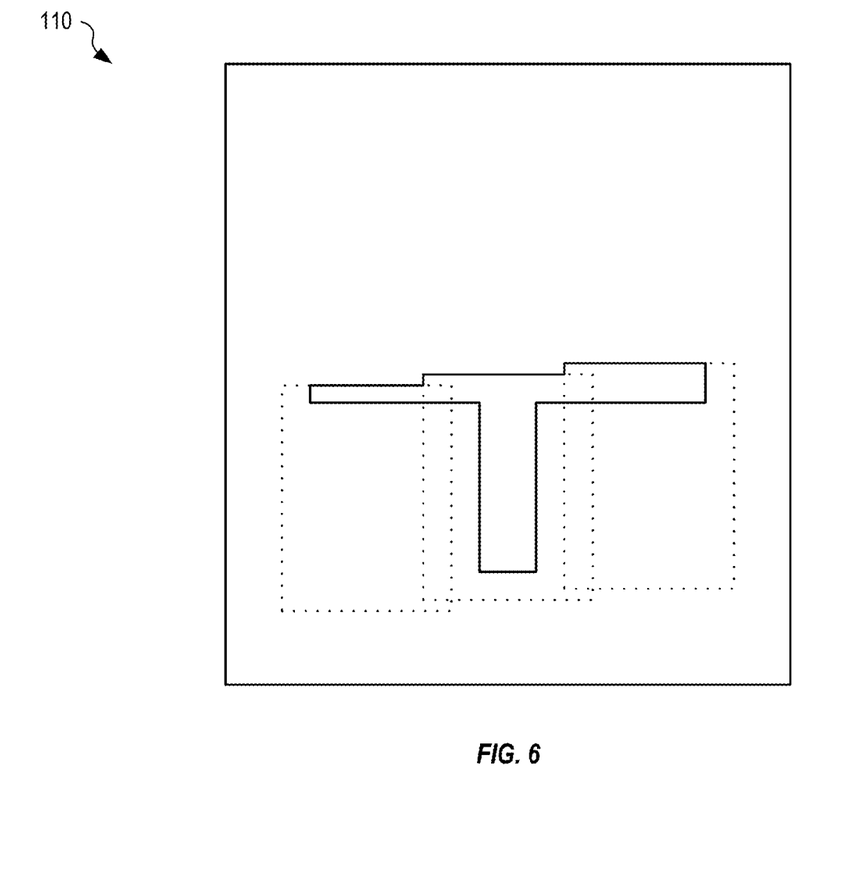
FIG. 6 shows the exemplary base image generated from the images vectors, and rotations of FIGS. 2, 3, 4, 5 and 6.

FIG. 2 shows exemplary movement 200 of scanner 152 over object 180 to generate images 162(1)-(3), vectors 164(2)-(3) and rotation angles 166(2)-(3) within scanner 152. The rotation angles are relatively small in this example, but they may be bigger in other scan operations. FIGS. 3, 4 and 5 show images 162(1), 162(2), and 162(3), respectively, and FIG. 6 shows base image 110 generated from these images, vectors, and rotations.

Figure 7:
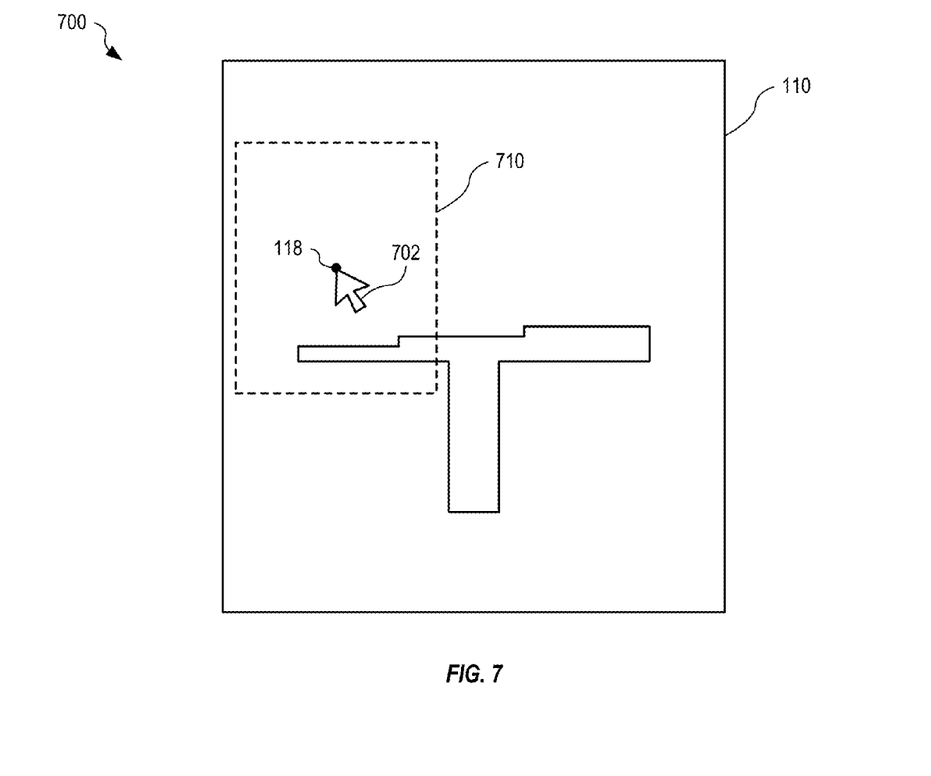
FIG. 7 shows an exemplary display by the computer of FIG. 1 to allow the user to interactively define the resume location on the base image.

FIG. 7 shows a display 700 generated by computer 102 that allows the user to interactively, using scanner 152 in mouse mode for example, define resume location 118 on base image 110. In the example of FIG. 7, the user positions mouse pointer 702 at resume location 118 to indicate that scanning should resume at or near that location. Resume location 118 defines an overlap area 710 within base image 110 where an overlap between previously scanned imagery and images from the resuming scan is expected. Overlap area 710 may be considered to have a predefined width and height relative to resume location 118, for example.

Figure 8:
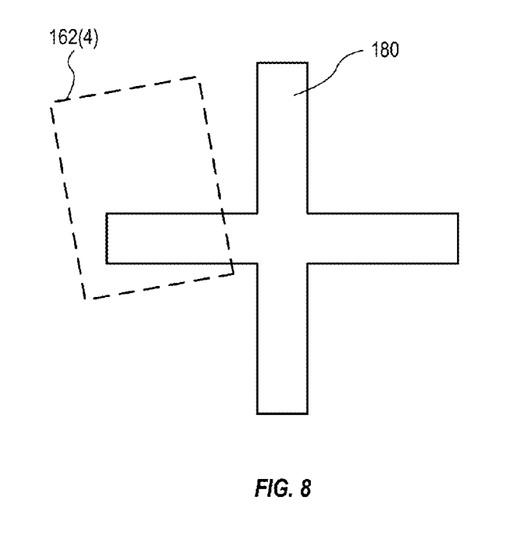
FIG. 8 shows exemplary positioning of the scanner of FIG. 1 over the object at a location corresponding to the resume location.
Figure 9:
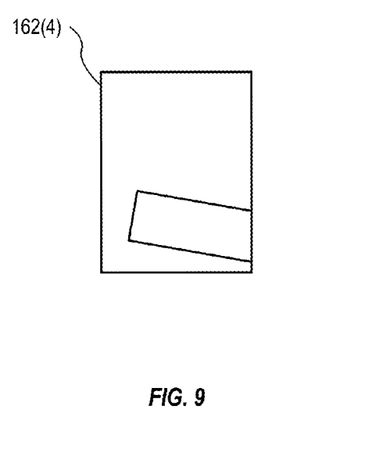
FIG. 9 shows the generated image from the scanner based upon the positioning of FIG. 8.

FIG. 8 shows positioning of scanner 152 over object 180 at a location corresponding to resume location 118. Scanner 152 is then controlled to generate image 162(4), shown in FIG. 9, which is sent to computer 102.

Figure 10:
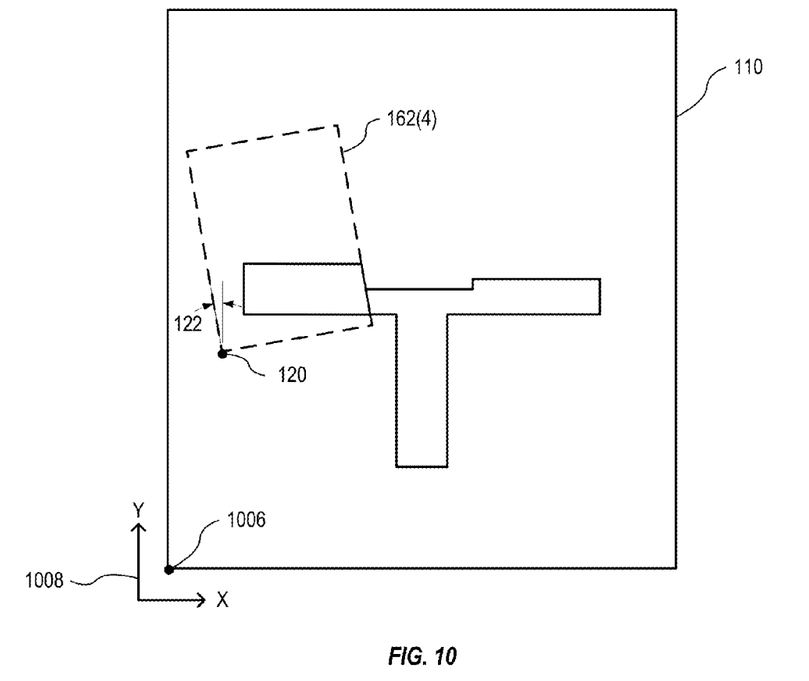
FIG. 10 shows exemplary matching of the image of FIG. 9 to the base image.

FIG. 10 shows exemplary matching of image 162(4) to base image 110 within overlap area 710 by resume function 132 which invokes match function 134 to determine a match location 120 and a match angle 122 of scanner 152 relative to base image 110. For example, resume function 132 may use a reference location 1006 within base image 110 (e.g., a corner of base image 110 as shown in FIG. 10, although other positions may be used without departing from the scope hereof) and an X-Y coordinate system 1008 to define resume location 118 within base image 110. Match angle 122 is then determined relative to the Y axis of coordinate system 1008, for example, to define the orientation of image 162(4) relative to base image 110, which is for example the orientation of scanner 152 relative to object 180 and base image 110. Other reference and coordinate systems may be used without departing from the scope hereof.

Figure 11:
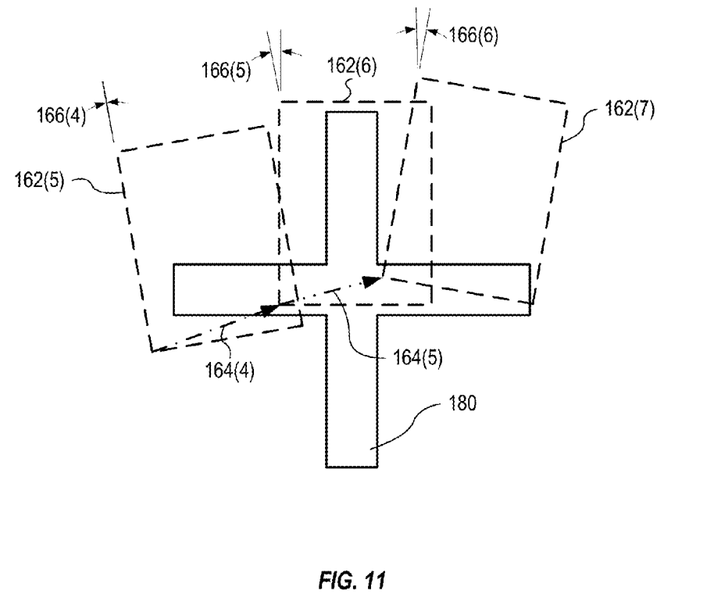
FIG. 11 shows further movement of the scanner by the user over the object to capture images, vectors, and rotation angles that are sent to the computer of FIG. 1 and added to the base image.
Figure 12:
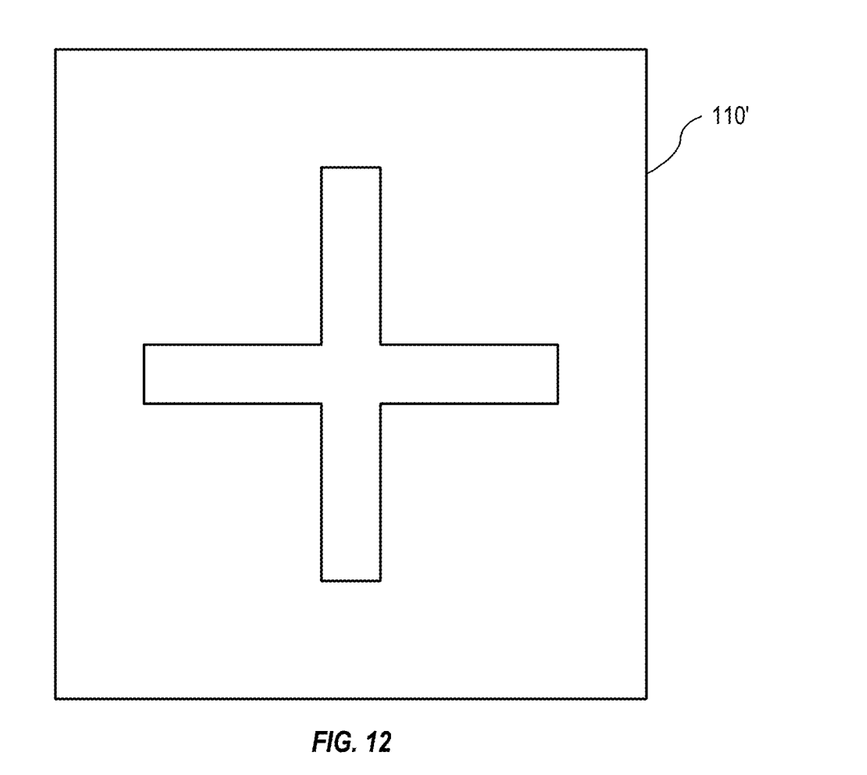
FIG. 12 shows and exemplary base image with the added images of FIG. 11.

FIG. 11 shows further movement, by the user, of scanner 152 over object 180 to capture images 162(5)-(7), vectors 164(4)-(5), and rotation angles 166(4)-(6) that are sent to computer 102 and added to base image 110 by application 130. FIG. 12 shows base image 110' that represents base image 100 updated with the added scan.

Figure 13:
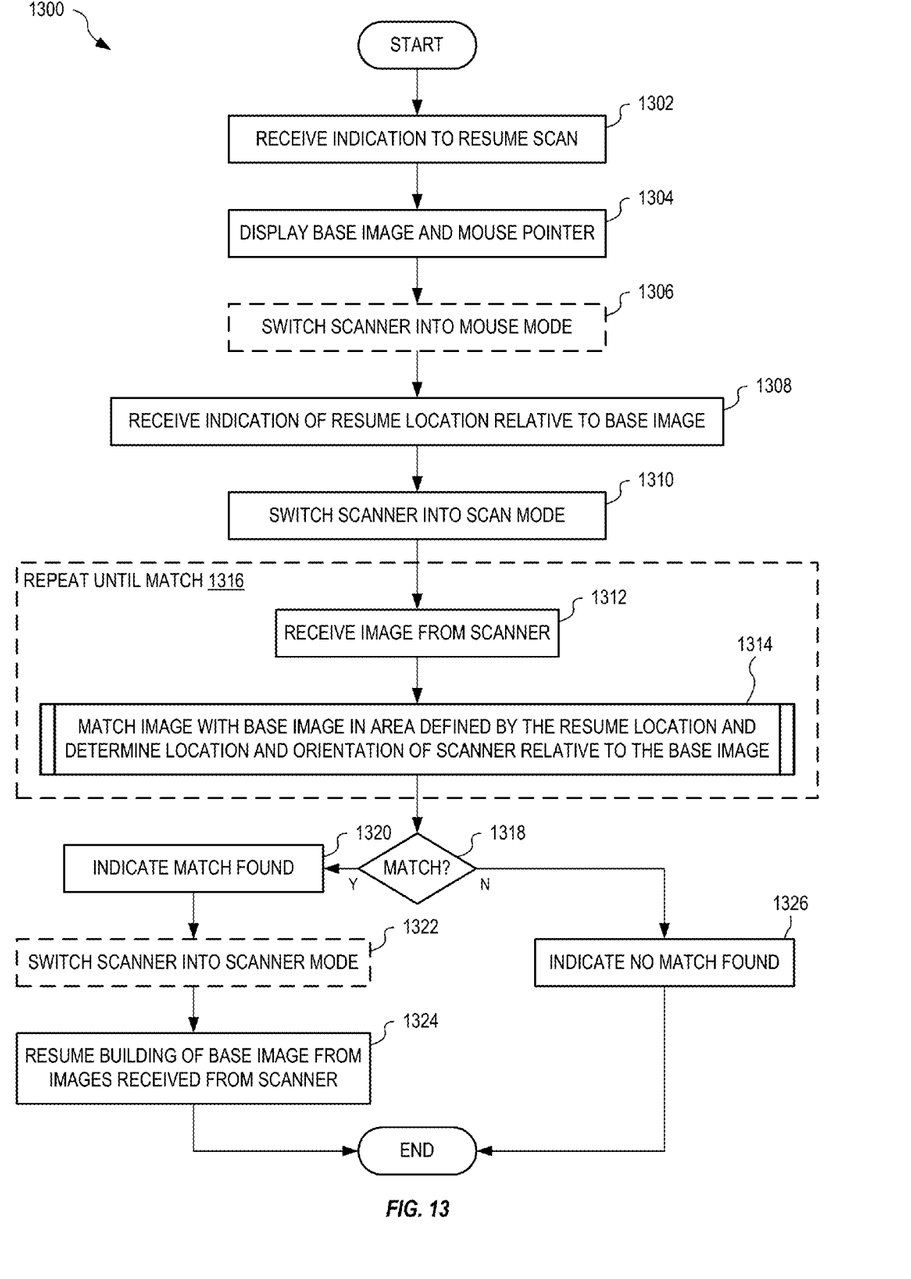
FIG. 13 is a flowchart illustrating one exemplary method for resuming capture of a base image of an object by a mobile scanner, in an embodiment.

FIG. 13 is a flowchart illustrating one exemplary method 1300 for resuming capture of base image 110 of object 180 by mobile scanner 152. Method 1300 is implemented within application 130 of computer 102, for example.

In step 1302, method 1300 receives an indication that the user wishes to resume a scan of an object. In one example of step 1302, the user presses a button on mobile scanner 152 to indicate that a recent scan is to be resumed. In another example of step 1302, the user presses a key sequence on a keyboard of computer 102 to indicate that the scan is to be resumed.

In step 1304, method 1300 displays the base image and a mouse pointer. In one example of step 1304, application 130 displays base image 110 and a mouse pointer on a display of computer 102. Step 1306 is optional. Step 1306 is implemented for example if scanner 152 is the only pointing input device of computer 102. If implemented, in step 1306, method 1300 switched the scanner into mouse mode. In one example of step 1306, application 130 sends a command via communication link 142 to instruct scanner 152 to set mode flag 160 into mouse mode, wherein scanner 152 operates similar to a conventional computer mouse.

In step 1308, method 1300 receives an indication of a resume location relative to the base image. In one example of step 1308, application 130 interacts with the user to receive an indication of resume location 118 by allowing the user to position the mouse pointer within base image 110 and indicate the resume location by clicking the mouse button. In another example, where the display of computer 102 is a touch screen the user touches the displayed base image 110 to indicate resume location 118.

In step 1310, method 1300 switches the scanner into scan mode. In one example of step 1310, application 130 sends a command via communication link 142 Optionally, the scanner is set into a coarse scan mode (i.e., the location mode), wherein the imaged captured by image sensor 158 have a lower resolution as compared to the images captured for constructing base image 110.

In step 1312, method 1300 receives an image from the scanner. In one example of step 1312, application 130 receives image 162 from scanner 152. In step 1314, method 1300 invokes a sub-method 1400 of FIG. 14 to match the received image with the base image within an area defined by the resume location and to determine the location and the orientation of the scanner relative to the base image. In one example of step 1314, sub-method 1400 is invoked to compare image 162 to base image 110 within overlap area 710 and to determine match location 120 and match angle 122 of scanner 152 relative to base image 110.

As indicated by dashed box 1316, steps 1312 and 1314 may repeat until a match is found in step 1314 to allow the user to adjust the position of the mobile scanner over object 180 until the match location and match angle are found. Once the match location and match angle are determined, method 1300 continues with step 1318.

Step 1318 is a decision. If, in step 1318, method 1300 determines that a match was successful, method 1300 continues with step 1320; otherwise method 1300 continues with step 1326.

In step 1320, method 1300 indicates to the user that the match is found. In one example of step 1320, application 130 causes computer 102 to make a sound to indicate that the image has been matched. In another example of step 1320, application 130 causes computer 102 to provide a visual signal to the user indicating that the image has been matched, such as a visual signal on the display of computer 102.

Step 1322 is optional. If, in step 1310, the scanner was switched into location mode (i.e., a coarse scan mode) to capture images at a lower resolution, step 1322 is implemented. If implemented, in step 1322, method 1300 switches the scanner into scanner mode (i.e., a normal scanning resolution mode). In one example of step 1322, application 130 sends a command via communication link 142 to scanner 152 to set mode flag 160 into scanner mode whereby scanner 152 captures image 162 from image sensor 158 at a higher resolution (and quality).

In step 1324, method 1300 resumes building of the base image from images received from the scanner. In one example of step 1324, application 130 continues to build up base image 110 by stitching on images 162 received from scanner 152 based upon (1) the determined match location 120 and match angle 122 of step 1314; and (2) the relative (to the previous image) movement information 168 received for each received image 162.

In step 1326, method 1300 indicates to the user that a match was not found. In one example of step 1326, application 130 causes computer 102 to make a different sound, as compared to the sound of step 1320, to indicate that the image has not been matched. In another example of step 1326, application 130 causes computer 102 to provide a visual signal to the user indicating that the image has not been matched, such as on the display of computer 102.

Steps 1302 through 1326 may repeat if the user indicates that the scan is to be resumed again such that base image 110 may be constructed of multiple scans, where each scan is resumed from an indicated resume location 118 on base image 110.

Figure 14:
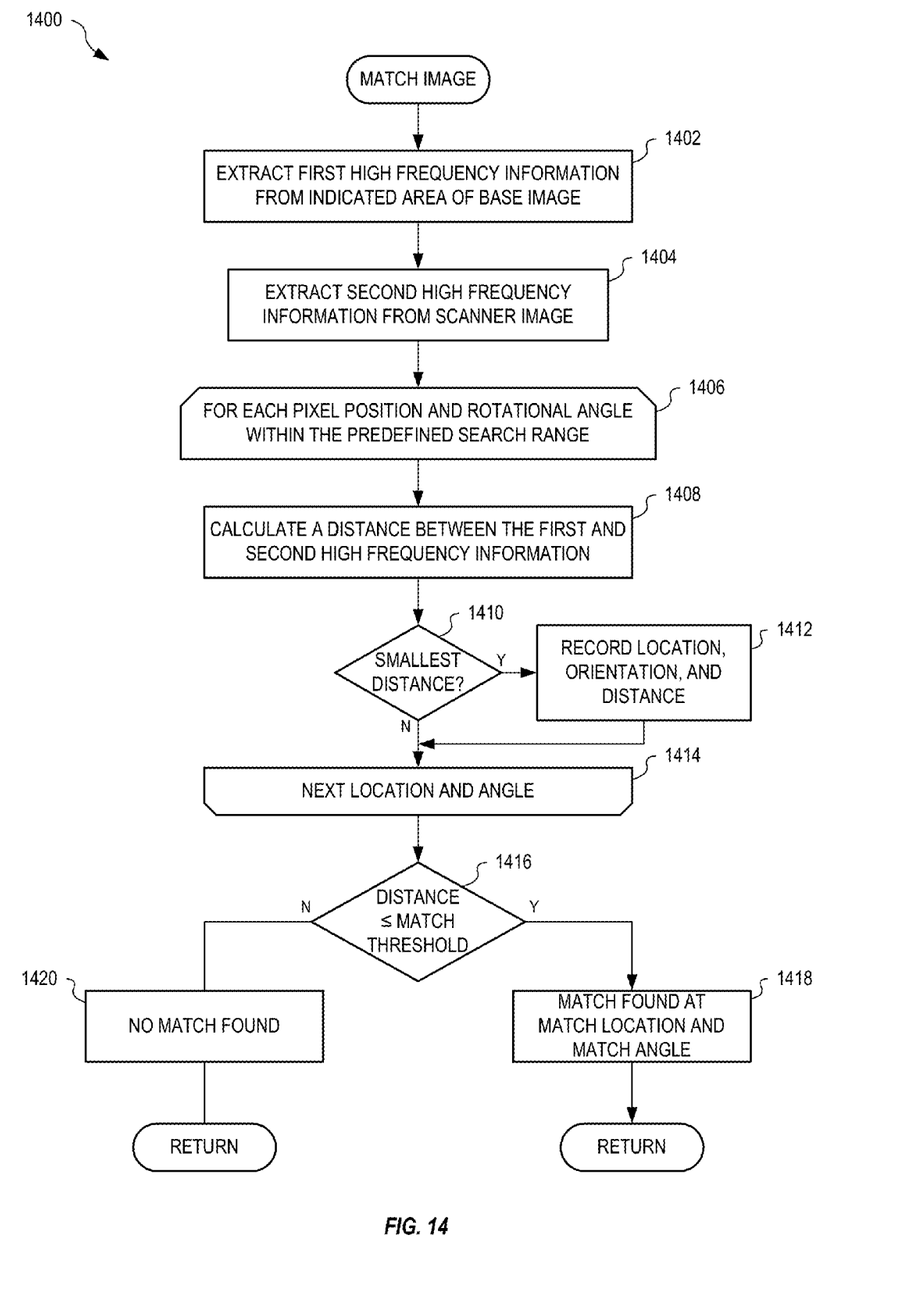
FIG. 14 shows an exemplary sub-method for matching an image to an indicated area of the base image to determine a match location and a match angle of the scanner relative to the base image, in an embodiment.
Figure 15:
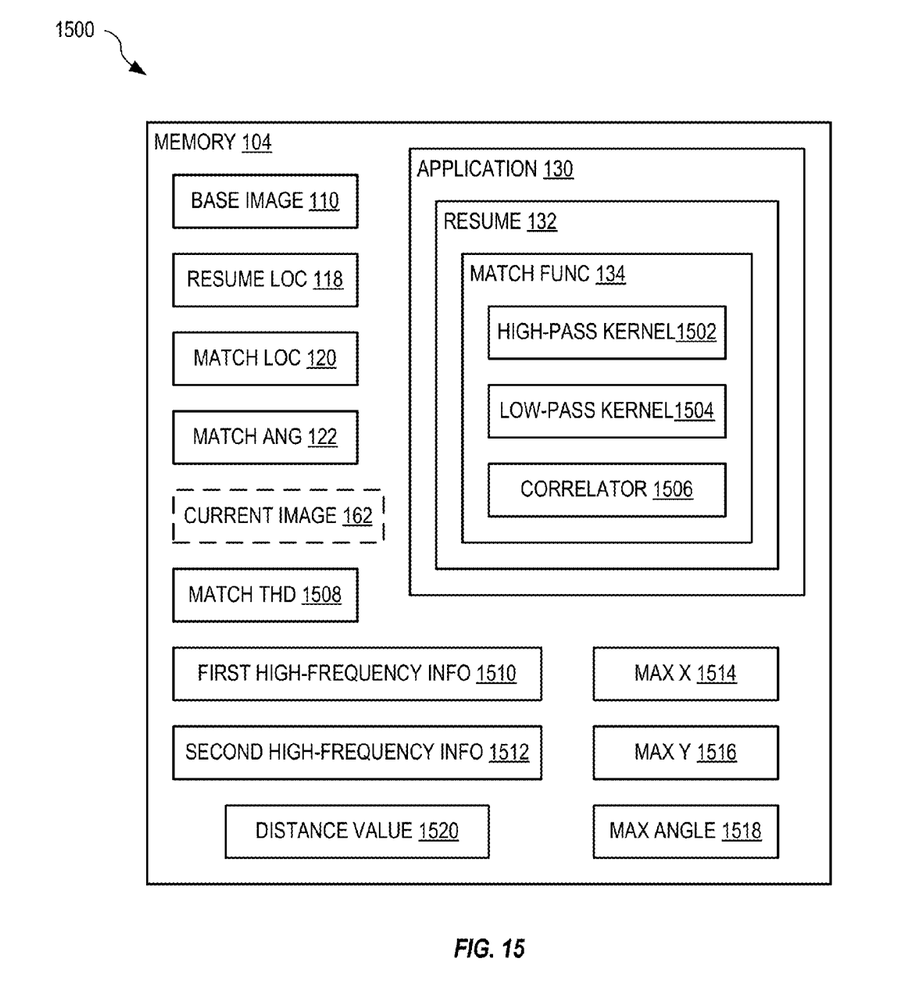
FIG. 15 shows the memory of FIG. 1 in further detail illustrating functionality of the match function and storage of high frequency information, in an embodiment.

FIG. 14 shows sub-method 1400 for matching an image to an indicated area of the base image and for determining a match location 120 and a match angle 122 of scanner 152 relative to base image 110. Sub-method 1400 is implemented within match function 134, for example. FIG. 15 shows memory 104 of FIG. 1 in further detail illustrating functionality of match function 134 and storage of high frequency information 1510, 1512. FIGS. 14 and 15 are best viewed together with the following description.

In step 1402, sub-method 1400 extracts first high frequency information 1510 from the indicated area of the base image. In one example of step 1402, match function 134 performs a direct convolution of a portion of base image 110 within overlap area 710 using a high-pass kernel to generate the high frequency information. In another example of step 1402, match function 134 uses a low-pass kernel 1504 to generate a low frequency image from the portion of base image 110 within overlap area 710 and then subtracts the low frequency image from the portion of the base image to generate the high frequency information.

Figure 18:
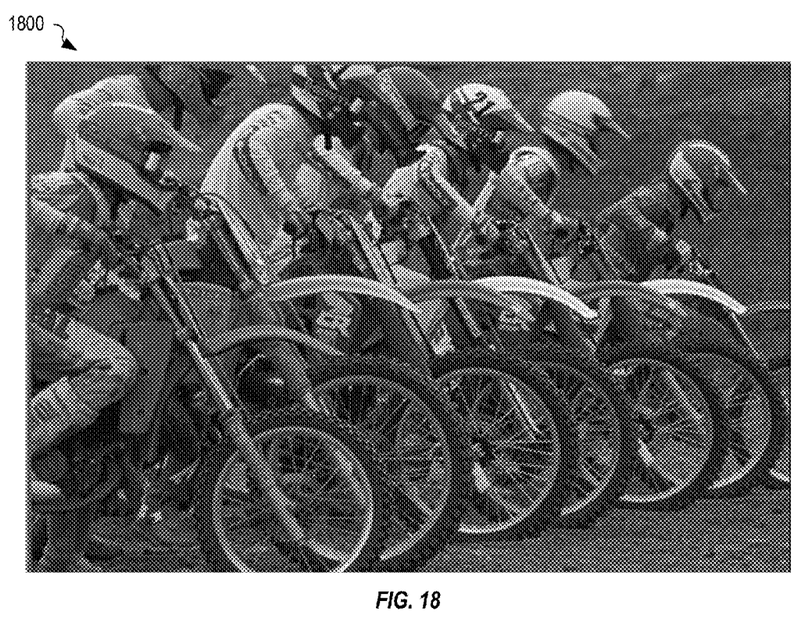
FIG. 18 shows one exemplary gray-scale image, in an embodiment.

In one example of step 1402, a color image composed of red/green/blue pixel values, is first converted into a gray-scale image A using the following formula:

For each pixel $$A = \frac{(R+G+B)}{3},$$

where R represents the red component of the pixel, G represents the green component of the pixel, and B represent the blue component of the pixel. FIG. 18 shows one exemplary gray-scale image 1800.

Figure 19:
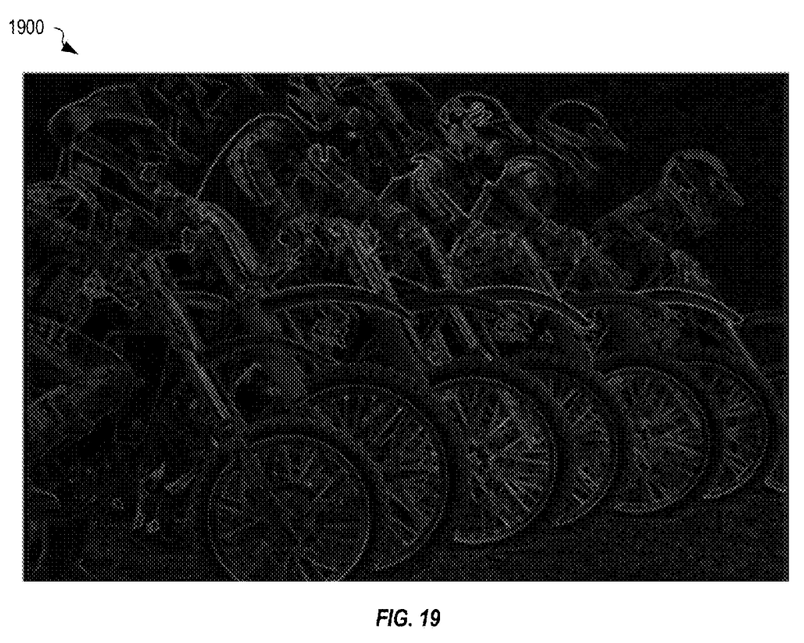
FIG. 19 shows one exemplary image containing high-frequency information extracted from the image of FIG. 18, in an embodiment.

Then, for each pixel of the gray-scale image, the following high frequency filter is applied to generate the high frequency information G.

$$G_x = \begin{bmatrix} -1 & 0 & +1 \\ -2 & 0 & +2 \\ -1 & 0 & +1 \end{bmatrix} * A$$

$$G_y = \begin{bmatrix} -1 & -2 & -1 \\ 0 & 0 & 0 \\ +1 & +2 & +1 \end{bmatrix} * A \text{ and}$$

$$G = \sqrt{G_x^2 + G_y^2}$$

where $G_x$ is the x-direction high-frequency value; $G_y$ is the y-direction high-frequency value; and G is the average of the determined x and y high-frequency components that forms the high-frequency information (e.g., first and second high frequency information 1510 and 1512). FIG. 19 shows one exemplary image 1900 containing high-frequency information (e.g., high-frequency information G) extracted from image 1800 of FIG. 18.

This high-frequency filtering technique may also be known as "unsharp masking". The high frequency information extracted from base image 110 contains features that may be easily matched. For example, portions of the image that have high color contrast and edges, etc., contain high frequency information that may be extracted and used for matching purposes. For example, an image containing a white line on a black background has high frequency information that may be easily extracted and matched.

In step 1404, sub-method 1400 extracts second high frequency information 1512 from the scanner image. In one example of step 1404, match function 134 performs a direct convolution of image 162 using a high-pass kernel to generate the second high frequency information. In another example of step 1404, match function 134 uses a low-pass kernel 1504 to generate a low frequency image from image 162 and then subtracts the low frequency image from image 162 to generate the second high frequency information. Step 1404 is similar to step 1402, and may use algorithms similar to those described above for step 1402, but applies these algorithms to process scanner image 162 to generate second high frequency information 1512.

Steps 1406 through 1414 form a loop that repeats to find match location 120 and match angle 122 such that correlation between second high frequency information 1512 and first high frequency information 1510 is greatest. In step 1406, sub-method 1400 steps through a predefined range of locations, relative to resume location 118, and steps through a predefined range of angles, relative to base image 110. It should be noted that other search and correlation techniques may be used herein without departing from the scope hereof.

In one example of step 1406, correlator 1506 uses a predefined max x variance 1514, a predefined max y variance 1516, and a max angle variance 1518 to position second high frequency information 1512 for correlation with first high frequency information 1510 at a location and orientation relative to resume location 118 and base image 110. That is, a maximum search offset is defined relative to resume location 118 and orientation of base image 110, based upon predefined parameters. These parameters include maximal movement offset values, which are max X variance 1514 and max Y variance 1516 defined along the X and Y directions, respectively, of base image 110. These parameters also include a predefined max angle variance 1518, relative to the orientation of base image 110.

In step 1408, sub-method 1400 calculates a distance between the first and second high frequency information. In one example of step 1408, correlator 1506 uses a distance calculation algorithm to calculate distance value 1520 to define how closely second high frequency information 1512 correlates to first high frequency information 1510 at the current location and orientation. Examples of distance calculation include an algorithm to calculate the Euclidean distance, i.e., to calculate the square root of the sum of the squares of the differences of coordinate values. Other examples of distance calculation include algorithms to calculate tangent distance or generalized Hausdorff distance, as one of ordinary skill in the art may comprehend. It should be noted that other distance calculation algorithms may be used herein without departing from the scope hereof.

Step 1410 is a decision. If, in step 1410, sub-method 1400 determines that the determined distance of step 1408 is the smallest, sub-method 1400 continues with step 1412; otherwise sub-method 1400 continues with step 1414. In step 1412, sub-method 1400 records the location, orientation, and distance. In one example of step 1412, correlator 1506 stores the current location and angle of step 1406 in match location 120 and match angle 122, respectively, and stores the determined distance of step 1408 within distance value 1520. Distance value 1520 is for example initialized to a maximum value prior to step 1406 and then used within step 1410 to determine if the distance determined in step 1408 is the smallest.

Step 1414 is the end of the loop, wherein the next location and angle are selected and steps 1408 through 1412 repeat. When all locations and angles have been tested, sub-method 1400 continues with step 1416.

Step 1416 is a decision. If, in step 1416, sub-method 1400 determines that the minimum distance is less than or equal to a predefined threshold, sub-method 1400 continues with step 1418; otherwise sub-method 1400 continues with step 1420. In one example of step 1416, correlator 1506 compares distance value 1520 with a predefined match threshold 1508 that defines a maximum distance value that is considered to be a close enough match between images to allow scanning to resume. For example, match threshold 1508 is selected such that distances between first and second high frequency 1510 and 1512 at non-matching locations are ignored, and such that a match is indicated when the errors in location and orientation are deemed to be sufficiently small. In step 1418, sub-method 1400 returns control to method 1300 indicating that a match was found. In step 1420, sub-method 1400 returns control to method 1300 indicating that a match was not found.

A correlation method using the first and second high frequency information is more processor efficient than methods that correlate unfiltered images 110 and 162. The high frequency correlation method has a high probability of success because the user has indicated the area within base image 110 where the match is expected. It is therefore unlikely that there will be multiple areas with identical high frequency information and therefore computational effort is further reduced. This correlation method also allows the use of lower resolution (e.g., a coarse scan) images (where "location mode" is implemented within scanner 152 to return lower resolution images for correlation purposes) to further reduce computational requirements, speed up the matching process, and increase overall efficiency.

Figure 16:
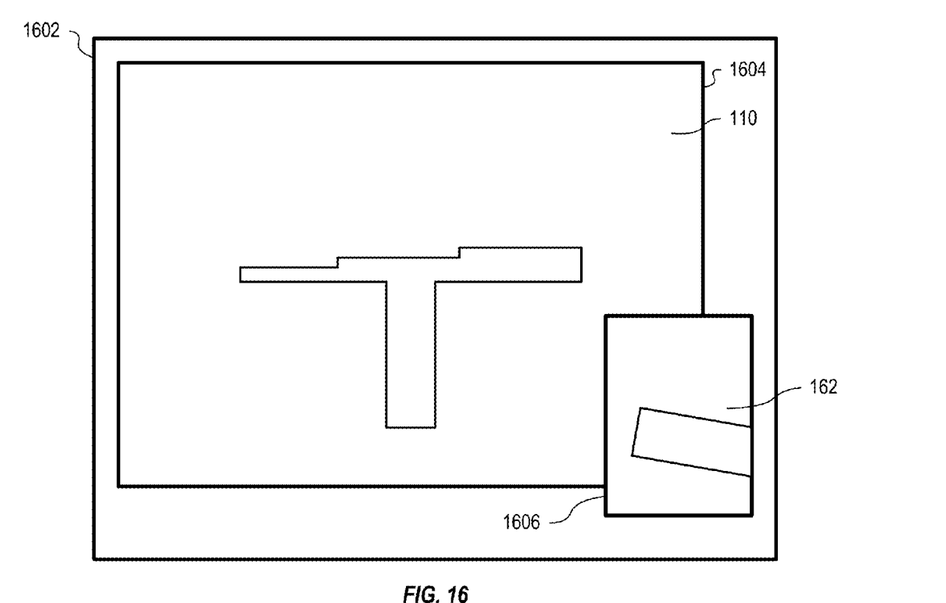
FIGS. 16 and 17 show an exemplary display of the computer of FIG. 1 concurrently displaying both the base image and the most recently captured image from the scanner.
Figure 17:
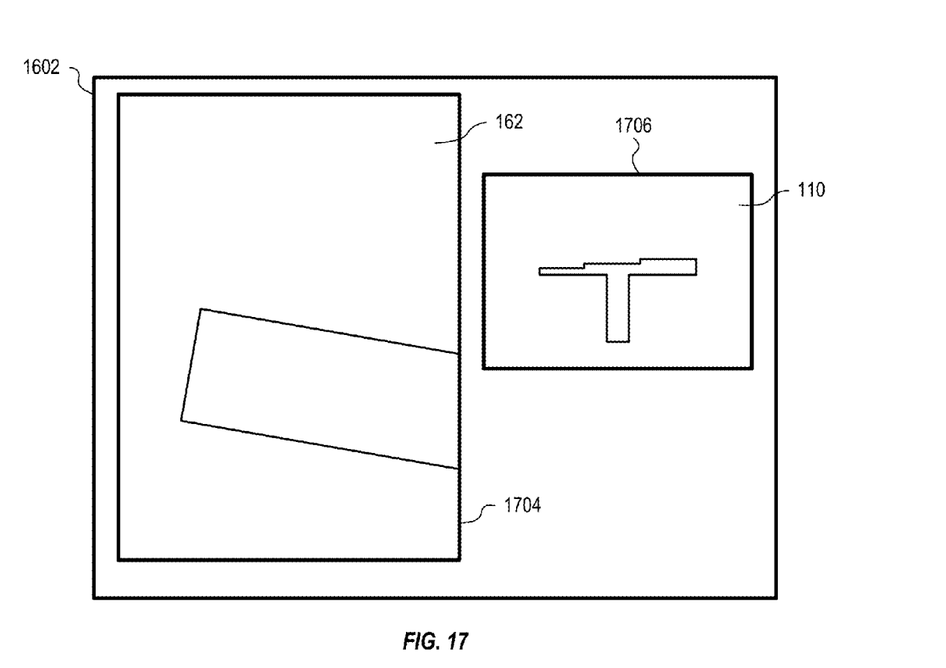

FIGS. 16 and 17 each show an exemplary display 1602 of computer 102 concurrently displaying both base image 110 and the most recently captured image 162 from scanner 152. In particular, FIG. 16 shows display 1602 with a large window 1604 displaying base image 110 and a smaller window 1606 displaying the most recently captured image 162 from scanner 152. FIG. 17 shows display 1602 with a large window 1704 displaying the most recently captured image 162 from scanner 152 and a smaller window 1706 displaying base image 110. The user may select the displayed size and position of each window. Smaller window 1606 and large window 1704 thereby display consecutive images received from scanner 152.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A computer-implemented method for resuming capture of a base image from an object by a mobile scanner operated by a user, comprising:

receiving an indication of an overlap area on a base image displayed on a display of the computer;

receiving a scan image from the mobile scanner positioned on the object at a location corresponding to the overlap area;

determining a match between a segment of the scan image and a corresponding segment of the base image, wherein the match defines a location and an orientation of the mobile scanner relative to the base image;

indicating to the user that a scan has resumed when the match is found; and stitching images subsequently received from the mobile scanner to the base image based upon the determined location and orientation.

2. The method of claim 1, the step of determining the match comprising:

extracting a first high frequency information from the indicated overlap area of the base image;

extracting a second high frequency information from the scanner image; and correlating the first high frequency information and the second high frequency information to determine the location and orientation.

3. The method of claim 2, the step of extracting the first high frequency information comprising applying a high pass filter for each pixel of the base image within the indicated overlap area to determine the first high frequency information.

4. The method of claim 2, the step of extracting the second high frequency information comprising applying a high pass filter for each pixel of the scan image to extract the second high frequency information.

5. The method of claim 1, further comprising consecutively displaying the scanner image and the subsequent scanner images on the display.

6. The method of claim 1, wherein the indication of the overlap area is made by engaging the mobile scanner in a mouse mode, and clicking the mouse when the mouse pointer is over the overlap area on the base image displayed on the display.

7. The method of claim 1, further comprising:

after the step of receiving an indication and before the step of receiving a scanner image, setting a location mode within the mobile scanner to select a lower resolution as compared with the resolution of an image used to construct the base image; and after the step of determining a match and before the step of stitching, setting a scan mode within the mobile scanner to select a higher resolution for scanning images for use in constructing the base image.

8. A computer-implemented method for resuming capture of an image of a source object using a mobile scanner, comprising:

receiving an indication of a scan resume point on a base image displayed within a display of a computer;

capturing a scan image from the mobile scanner positioned on the source object at a location indicated by the scan resume point during a subsequent scan operation, wherein the captured scan image overlaps at least a portion of the base image at an overlap area;

matching a segment of the captured scan image and a corresponding segment of the base image at the overlap area to determine a location and an orientation of the mobile scanner relative to the base image; and stitching subsequent scan images received from the mobile scanner to the base image when the match has been found.

9. The computer-implemented method of claim 8, wherein the step of matching comprises:

extracting a first high frequency information from the overlap area of the base image;

extracting a second high frequency information from the captured scan image; and correlating the first high frequency information and the second high frequency information to determine the location and the orientation.

10. The computer-implemented method of claim 8, further comprising indicating, when the match has been found, that the user may resume scanning the source object.

11. The computer-implemented method of claim 8, wherein the captured scan image has a lower resolution as compared with the subsequent scan images.

12. The computer-implemented method of claim 8, further comprising consecutively displaying the captured scan image and the subsequent scan images on the display.

13. The computer-implemented method of claim 8, wherein the stitching is based upon movement of the mobile scanner relative to the location and the orientation.

14. A system for resuming capture of a base image from an object, comprising:

a mobile scanner for capturing images of the object; and a computer, in communication with the mobile scanner, comprising a processor and a memory, wherein machine readable instructions, stored within the memory and executed by the processor, control the computer to:

receive an indication of an overlap area on the base image displayed on a display of the computer;

receive a scanner image from the mobile scanner positioned on the object at a location corresponding to the overlap area;

determine a match between a segment of the scanner image and a corresponding segment of the base image, wherein the match defines a location and an orientation of the mobile scanner relative to the base image;

indicate to the user that a scan has resumed when the match has been found; and stitch images subsequently received from the mobile scanner to the base image based upon the location and the orientation.

15. The system of claim 14, wherein the machine readable instructions, when executed by the processor, further control the computer to:

extract a first high frequency information from the indicated overlap area of the base image;

extract a second high frequency information from the scanner image; and correlate the first high frequency image and the second high frequency information to determine the location and the orientation.

16. The system of claim 15, wherein the machine readable instructions, when executed by the processor, further control the computer to apply a high pass filter to extract the first high frequency information and the second high frequency information.

17. The system of claim 14, wherein the machine readable instructions, when executed by the processor, further control the computer to consecutively display the scanner image and the subsequent scanner images on the display.

18. The system of claim 14, wherein the indication of the overlap area is made by a user engaging the mobile scanner in a mouse mode and positioning a mouse pointer over the overlap area on the base image displayed on the display.

19. The system of claim 14, wherein the machine readable instructions, when executed by the processor, further control the computer to:

select, within the mobile scanner, a lower resolution mode, as compared with the resolution of an image used to construct the base image, for use when searching for a match; and select, within the mobile scanner, a higher resolution for scanning images for stitching when constructing the base image.

20. A scanner system for resuming capture of a base image of an object, comprising:

a multi-purpose scanner that operates as a computer mouse and a scanner; and machine readable instructions, stored within a memory of a computer that is in communication with the multi-purpose scanner, that, when executed by a processor of the computer, perform the steps of:

receiving an indication of an overlap area on a base image displayed on a display of the computer;

receiving a scan image from the multi-purpose scanner positioned on the object at a location corresponding to the overlap area;

determining a match between a segment of the scan image and a corresponding segment of the base image, wherein the match defines a location and an orientation of the multi-purpose scanner relative to the base image;

indicating to a user that a scan has resumed when the match has been found; and stitching images subsequently received from the multi-purpose scanner to the base image based upon the location and the orientation.

21. The system of claim 20, wherein the machine readable instructions, when executed by the processor, further perform the steps of:

extracting a first high frequency information from the indicated overlap area of the base image;

extracting a second high frequency information from the scan image; and correlating the first high frequency information and the second high frequency information to determine the location and the orientation.

* * * * *